United States Patent
Robinson et al.

(10) Patent No.: US 8,978,098 B2
(45) Date of Patent: *Mar. 10, 2015

(54) CENTRALIZED USER AUTHENTICATION SYSTEM APPARATUS AND METHOD

(71) Applicant: Quest Software, Inc., Aliso Viejo, CA (US)

(72) Inventors: Kyle Lane Robinson, Spanish Fork, UT (US); John Joseph Bowers, Provo, UT (US)

(73) Assignee: Dell Software, Inc., Aliso Viejo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/864,866

(22) Filed: Apr. 17, 2013

(65) Prior Publication Data

US 2013/0340055 A1 Dec. 19, 2013

Related U.S. Application Data

(63) Continuation of application No. 11/424,874, filed on Jun. 18, 2006, now Pat. No. 8,429,712.

(60) Provisional application No. 60/804,245, filed on Jun. 8, 2006.

(51) Int. Cl.
  *G06F 21/00* (2013.01)

(52) U.S. Cl.
  USPC ...... 726/2; 726/4; 726/10; 713/182; 713/189; 380/255; 455/411; 705/76; 709/223

(58) Field of Classification Search
  USPC .......................................................... 726/2
  See application file for complete search history.

(56) References Cited

U.S. PATENT DOCUMENTS

| 4,109,237 A | 8/1978 | Hill |
| 4,370,707 A | 1/1983 | Phillips et al. |
| 4,694,397 A | 9/1987 | Grant |

(Continued)

FOREIGN PATENT DOCUMENTS

| EP | 05728119.1 | 3/2005 |
| EP | 1 932 279 A2 | 6/2008 |

(Continued)

OTHER PUBLICATIONS

U.S. Appl. No. 12/200,814, filed Aug. 28, 2008, Eyes et al.

(Continued)

*Primary Examiner* — Morshed Mehedi
(74) *Attorney, Agent, or Firm* — Knobbe Martens Olson & Bear LLP

(57) ABSTRACT

An identification module receives a password request for a specified user and communicates an encrypted password field in response thereto, wherein the encrypted password field references a directory object corresponding to the specified user. The present invention also teaches an authentication module that communicates the password request to the identification module and receives the encrypted password field therefrom. Upon receiving the encrypted password field, the authentication module authenticates the specified user against the referenced directory object. In some embodiments, the encrypted password field is stored in an identification data store of an identification server and the directory object is stored in an authentication data store of an authentication server.

10 Claims, 6 Drawing Sheets

(56) References Cited

U.S. PATENT DOCUMENTS

| | | |
|---|---|---|
| 5,222,018 A | 6/1993 | Sharpe et al. |
| 5,267,865 A | 12/1993 | Lee et al. |
| 5,302,132 A | 4/1994 | Corder |
| 5,310,349 A | 5/1994 | Daniels et al. |
| 5,313,465 A | 5/1994 | Perlman et al. |
| 5,333,302 A | 7/1994 | Hensley et al. |
| 5,339,435 A | 8/1994 | Lubkin et al. |
| 5,367,698 A | 11/1994 | Webber et al. |
| 5,371,852 A | 12/1994 | Attanasio et al. |
| 5,387,104 A | 2/1995 | Corder |
| 5,410,703 A | 4/1995 | Nilsson et al. |
| 5,423,032 A | 6/1995 | Byrd et al. |
| 5,437,027 A | 7/1995 | Bannon et al. |
| 5,437,555 A | 8/1995 | Ziv-el |
| 5,440,719 A | 8/1995 | Hanes et al. |
| 5,441,415 A | 8/1995 | Lee et al. |
| 5,497,486 A | 3/1996 | Stolfo et al. |
| 5,497,492 A | 3/1996 | Zbikowski et al. |
| 5,499,379 A | 3/1996 | Tanaka et al. |
| 5,530,829 A | 6/1996 | Beardsley et al. |
| 5,550,968 A | 8/1996 | Miller et al. |
| 5,550,976 A | 8/1996 | Henderson et al. |
| 5,553,291 A | 9/1996 | Tanaka et al. |
| 5,586,304 A | 12/1996 | Stupek, Jr. et al. |
| 5,590,360 A | 12/1996 | Edwards |
| 5,600,833 A | 2/1997 | Senn et al. |
| 5,608,874 A | 3/1997 | Ogawa et al. |
| 5,608,903 A | 3/1997 | Prasad et al. |
| 5,613,090 A | 3/1997 | Willems |
| 5,623,601 A | 4/1997 | Vu |
| 5,630,069 A | 5/1997 | Flores et al. |
| 5,630,131 A | 5/1997 | Palevich et al. |
| 5,659,735 A | 8/1997 | Parrish et al. |
| 5,659,736 A | 8/1997 | Hasegawa et al. |
| 5,666,502 A | 9/1997 | Capps et al. |
| 5,671,428 A | 9/1997 | Muranaga et al. |
| 5,673,386 A | 9/1997 | Batra |
| 5,673,387 A | 9/1997 | Chen et al. |
| 5,675,782 A | 10/1997 | Montague et al. |
| 5,677,997 A | 10/1997 | Talatik |
| 5,680,586 A | 10/1997 | Elkins et al. |
| 5,684,950 A | 11/1997 | Dare et al. |
| 5,692,132 A | 11/1997 | Hogan |
| 5,692,902 A | 12/1997 | Aeby |
| 5,694,540 A | 12/1997 | Humelsine et al. |
| 5,706,502 A | 1/1998 | Foley et al. |
| 5,708,812 A | 1/1998 | Van Dyke et al. |
| 5,708,828 A | 1/1998 | Coleman |
| 5,710,884 A | 1/1998 | Dedrick |
| 5,711,671 A | 1/1998 | Geeslin et al. |
| 5,724,521 A | 3/1998 | Dedrick |
| 5,727,145 A | 3/1998 | Nessett et al. |
| 5,727,951 A | 3/1998 | Ho et al. |
| 5,740,427 A | 4/1998 | Stoller et al. |
| 5,743,746 A | 4/1998 | Ho et al. |
| 5,745,113 A | 4/1998 | Jordan et al. |
| 5,745,902 A | 4/1998 | Miller et al. |
| 5,752,042 A | 5/1998 | Cole et al. |
| 5,754,173 A | 5/1998 | Hiura et al. |
| 5,754,938 A | 5/1998 | Herz et al. |
| 5,758,062 A | 5/1998 | Mcmahon et al. |
| 5,758,074 A | 5/1998 | Marlin et al. |
| 5,758,344 A | 5/1998 | Prasad et al. |
| 5,764,897 A | 6/1998 | Khalidi |
| 5,765,140 A | 6/1998 | Knudson et al. |
| 5,768,519 A | 6/1998 | Swift et al. |
| 5,774,551 A | 6/1998 | Wu et al. |
| 5,778,169 A | 7/1998 | Reinhardt |
| 5,784,553 A | 7/1998 | Kolawa et al. |
| 5,784,643 A | 7/1998 | Shields |
| 5,790,801 A | 8/1998 | Funato |
| 5,796,393 A | 8/1998 | Macnaughton et al. |
| 5,806,075 A | 9/1998 | Jain et al. |
| 5,812,669 A | 9/1998 | Jenkins et al. |
| 5,812,865 A | 9/1998 | Theimer et al. |
| 5,815,657 A | 9/1998 | Williams et al. |
| 5,819,265 A | 10/1998 | Ravin et al. |
| 5,819,281 A | 10/1998 | Cummins |
| 5,819,295 A | 10/1998 | Nakagawa et al. |
| 5,822,518 A | 10/1998 | Ooki et al. |
| 5,835,087 A | 11/1998 | Herz et al. |
| 5,835,911 A | 11/1998 | Nakagawa et al. |
| 5,838,918 A | 11/1998 | Prager et al. |
| 5,844,508 A | 12/1998 | Murashita et al. |
| 5,848,396 A | 12/1998 | Gerace |
| 5,859,972 A | 1/1999 | Subramaniam et al. |
| 5,872,928 A | 2/1999 | Lewis et al. |
| 5,872,973 A | 2/1999 | Mitchell et al. |
| 5,878,432 A | 3/1999 | Misheski et al. |
| 5,889,520 A | 3/1999 | Glaser |
| 5,890,161 A | 3/1999 | Helland et al. |
| 5,890,175 A | 3/1999 | Wong et al. |
| 5,892,898 A | 4/1999 | Fujii et al. |
| 5,893,074 A | 4/1999 | Hughes et al. |
| 5,893,076 A | 4/1999 | Hafner et al. |
| 5,893,916 A | 4/1999 | Dooley |
| 5,930,512 A | 7/1999 | Boden et al. |
| 5,937,165 A | 8/1999 | Schwaller et al. |
| 5,948,064 A | 9/1999 | Bertram et al. |
| 5,949,419 A | 9/1999 | Domine et al. |
| 5,956,732 A | 9/1999 | Tsuchida |
| 5,956,736 A | 9/1999 | Hanson et al. |
| 5,960,200 A | 9/1999 | Eager et al. |
| 5,968,176 A | 10/1999 | Nessett et al. |
| 5,987,247 A | 11/1999 | Lau |
| 5,995,114 A | 11/1999 | Wegman et al. |
| 6,002,868 A | 12/1999 | Jenkins et al. |
| 6,003,047 A | 12/1999 | Osmond et al. |
| 6,014,669 A | 1/2000 | Slaughter et al. |
| 6,014,712 A | 1/2000 | Islam et al. |
| 6,016,495 A | 1/2000 | Mckeehan et al. |
| 6,016,501 A | 1/2000 | Martin et al. |
| 6,021,496 A | 2/2000 | Dutcher et al. |
| 6,029,178 A | 2/2000 | Martin et al. |
| 6,029,195 A | 2/2000 | Herz |
| 6,029,247 A | 2/2000 | Ferguson |
| 6,035,323 A | 3/2000 | Narayen et al. |
| 6,041,344 A | 3/2000 | Bodamer et al. |
| 6,044,368 A | 3/2000 | Powers |
| 6,044,465 A | 3/2000 | Dutcher et al. |
| 6,049,822 A | 4/2000 | Mittal |
| 6,052,512 A | 4/2000 | Peterson et al. |
| 6,055,538 A | 4/2000 | Kessenich et al. |
| 6,058,260 A | 5/2000 | Brockel et al. |
| 6,058,379 A | 5/2000 | Odom et al. |
| 6,061,643 A | 5/2000 | Walker et al. |
| 6,061,650 A | 5/2000 | Malking et al. |
| 6,067,568 A | 5/2000 | Li et al. |
| 6,070,184 A | 5/2000 | Blount et al. |
| 6,076,166 A | 6/2000 | Moshfeghi et al. |
| 6,079,020 A | 6/2000 | Liu |
| 6,092,199 A | 7/2000 | Dutcher et al. |
| 6,101,481 A | 8/2000 | Miller |
| 6,101,503 A | 8/2000 | Cooper et al. |
| 6,108,649 A | 8/2000 | Young et al. |
| 6,108,670 A | 8/2000 | Weida et al. |
| 6,112,228 A | 8/2000 | Earl et al. |
| 6,112,240 A | 8/2000 | Pogue et al. |
| 6,115,040 A | 9/2000 | Bladow et al. |
| 6,115,544 A | 9/2000 | Mueller |
| 6,134,548 A | 10/2000 | Gottsman et al. |
| 6,137,869 A | 10/2000 | Voit et al. |
| 6,138,086 A | 10/2000 | Rose et al. |
| 6,141,006 A | 10/2000 | Knowlton et al. |
| 6,141,010 A | 10/2000 | Hoyle |
| 6,141,647 A | 10/2000 | Meijer et al. |
| 6,151,600 A | 11/2000 | Dedrick |
| 6,151,610 A | 11/2000 | Senn et al. |
| 6,161,176 A | 12/2000 | Hunter et al. |
| 6,167,445 A | 12/2000 | Gai et al. |
| 6,167,564 A | 12/2000 | Fontana et al. |
| 6,170,009 B1 | 1/2001 | Mandal et al. |
| 6,182,212 B1 | 1/2001 | Atkins et al. |
| 6,182,226 B1 | 1/2001 | Reid et al. |

(56) References Cited

U.S. PATENT DOCUMENTS

| | | |
|---|---|---|
| 6,185,625 B1 | 2/2001 | Tso et al. |
| 6,195,794 B1 | 2/2001 | Buxton |
| 6,199,068 B1 | 3/2001 | Carpenter |
| 6,199,079 B1 | 3/2001 | Gupta et al. |
| 6,202,051 B1 | 3/2001 | Woolston |
| 6,205,480 B1 | 3/2001 | Broadhurst et al. |
| 6,208,345 B1 | 3/2001 | Sheard et al. |
| 6,209,000 B1 | 3/2001 | Klein et al. |
| 6,209,033 B1 | 3/2001 | Datta et al. |
| 6,222,535 B1 | 4/2001 | Hurd, II |
| 6,223,221 B1 | 4/2001 | Kunz |
| 6,226,649 B1 | 5/2001 | Bodamer et al. |
| 6,230,160 B1 | 5/2001 | Chan et al. |
| 6,230,184 B1 | 5/2001 | Chan et al. |
| 6,230,309 B1 | 5/2001 | Turner et al. |
| 6,233,584 B1 | 5/2001 | Purcell |
| 6,237,114 B1 | 5/2001 | Wookey et al. |
| 6,246,410 B1 | 6/2001 | Bergeron et al. |
| 6,249,905 B1 | 6/2001 | Yoshida et al. |
| 6,256,637 B1 | 7/2001 | Venkatesh et al. |
| 6,256,659 B1 | 7/2001 | Mclain, Jr. et al. |
| 6,256,678 B1 | 7/2001 | Traughber et al. |
| 6,260,068 B1 | 7/2001 | Zalewski et al. |
| 6,263,352 B1 | 7/2001 | Cohen |
| 6,266,666 B1 | 7/2001 | Ireland et al. |
| 6,269,405 B1 | 7/2001 | Dutcher et al. |
| 6,269,406 B1 | 7/2001 | Dutcher et al. |
| 6,272,673 B1 | 8/2001 | Dale et al. |
| 6,272,678 B1 | 8/2001 | Imachi et al. |
| 6,279,030 B1 | 8/2001 | Britton et al. |
| 6,282,576 B1 | 8/2001 | Lane |
| 6,282,605 B1 | 8/2001 | Moore |
| 6,286,028 B1 | 9/2001 | Cohen et al. |
| 6,286,104 B1 | 9/2001 | Buhle et al. |
| 6,301,601 B1 | 10/2001 | Helland et al. |
| 6,304,893 B1 | 10/2001 | Gish |
| 6,308,164 B1 | 10/2001 | Nummelin et al. |
| 6,308,188 B1 | 10/2001 | Bernardo et al. |
| 6,308,273 B1 | 10/2001 | Goertzel et al. |
| 6,313,835 B1 | 11/2001 | Gever et al. |
| 6,314,434 B1 | 11/2001 | Shigemi et al. |
| 6,327,677 B1 | 12/2001 | Garg et al. |
| 6,330,566 B1 | 12/2001 | Durham |
| 6,336,118 B1 | 1/2002 | Hammond |
| 6,341,287 B1 | 1/2002 | Siziklai et al. |
| 6,345,239 B1 | 2/2002 | Bowman-amuah |
| 6,349,287 B1 | 2/2002 | Hayashi |
| 6,363,398 B1 | 3/2002 | Andersen |
| 6,370,573 B1 | 4/2002 | Bowman Amuah |
| 6,370,646 B1 | 4/2002 | Goodman et al. |
| 6,381,579 B1 | 4/2002 | Gervais et al. |
| 6,389,589 B1 | 5/2002 | Mishra et al. |
| 6,401,085 B1 | 6/2002 | Gershman et al. |
| 6,401,211 B1 | 6/2002 | Brezak et al. |
| 6,405,364 B1 | 6/2002 | Bowman-amuah |
| 6,430,556 B1 | 8/2002 | Goldberg et al. |
| 6,438,514 B1 | 8/2002 | Hill et al. |
| 6,442,620 B1 | 8/2002 | Thatte et al. |
| 6,446,096 B1 | 9/2002 | Holland et al. |
| 6,453,317 B1 | 9/2002 | Lacost et al. |
| 6,457,130 B2 | 9/2002 | Hitz et al. |
| 6,466,932 B1 | 10/2002 | Dennis et al. |
| 6,469,713 B2 | 10/2002 | Hetherington et al. |
| 6,473,794 B1 | 10/2002 | Guheen et al. |
| 6,496,847 B1 | 12/2002 | Bugnion et al. |
| 6,567,818 B1 | 5/2003 | Frey et al. |
| 6,587,876 B1 | 7/2003 | Mahon et al. |
| 6,615,258 B1 | 9/2003 | Barry et al. |
| 6,625,622 B1 | 9/2003 | Henrickson et al. |
| 6,658,625 B1 | 12/2003 | Allen |
| 6,678,714 B1 | 1/2004 | Olapurath et al. |
| 6,715,128 B1 | 3/2004 | Hirashima et al. |
| 6,728,877 B2 | 4/2004 | Mackin et al. |
| 6,735,691 B1 | 5/2004 | Capps et al. |
| 6,757,696 B2 | 6/2004 | Multer et al. |
| 6,760,761 B1 | 7/2004 | Sciacca |
| 6,795,835 B2 | 9/2004 | Ricart et al. |
| 6,801,946 B1 | 10/2004 | Child et al. |
| 6,817,017 B2 | 11/2004 | Goodman |
| 6,839,766 B1 | 1/2005 | Parnafes et al. |
| 6,880,005 B1 | 4/2005 | Bell et al. |
| 6,925,477 B1 | 8/2005 | Champagne et al. |
| 6,938,158 B2 | 8/2005 | Azuma |
| 6,941,465 B1 | 9/2005 | Palekar et al. |
| 6,944,183 B1 | 9/2005 | Iyer et al. |
| 6,950,818 B2 | 9/2005 | Dennis et al. |
| 6,950,935 B1 | 9/2005 | Allavarpu et al. |
| 6,968,370 B2 | 11/2005 | Wu |
| 6,973,488 B1 | 12/2005 | Yavatkar et al. |
| 6,976,090 B2 | 12/2005 | Ben-Shaul et al. |
| 7,028,079 B2 | 4/2006 | Mastrianni et al. |
| 7,062,781 B2 | 6/2006 | Shambroom |
| 7,080,077 B2 | 7/2006 | Ramamurthy et al. |
| 7,089,584 B1 | 8/2006 | Sharma |
| 7,100,195 B1 | 8/2006 | Underwood |
| 7,117,486 B2 | 10/2006 | Wong et al. |
| 7,133,984 B1 | 11/2006 | Dickensheets |
| 7,139,973 B1 | 11/2006 | Kirkwood et al. |
| 7,143,095 B2 | 11/2006 | Barrett et al. |
| 7,162,640 B2 | 1/2007 | Heath et al. |
| 7,171,458 B2 | 1/2007 | Brown et al. |
| 7,185,073 B1 | 2/2007 | Gai et al. |
| 7,209,970 B1 | 4/2007 | Everson et al. |
| 7,213,266 B1 | 5/2007 | Maher et al. |
| 7,216,181 B1 | 5/2007 | Jannu et al. |
| 7,231,460 B2 | 6/2007 | Sullivan et al. |
| 7,234,157 B2 | 6/2007 | Childs et al. |
| 7,243,370 B2 | 7/2007 | Bobde et al. |
| 7,284,043 B2 | 10/2007 | Feinleib et al. |
| 7,299,504 B1 | 11/2007 | Tiller et al. |
| 7,346,766 B2 | 3/2008 | Mackin et al. |
| 7,356,601 B1 | 4/2008 | Clymer et al. |
| 7,356,816 B2 | 4/2008 | Goodman et al. |
| 7,379,996 B2 | 5/2008 | Papatla et al. |
| 7,418,597 B2 | 8/2008 | Thornton et al. |
| 7,421,555 B2 | 9/2008 | Dorey |
| 7,426,642 B2 | 9/2008 | Aupperle et al. |
| 7,428,583 B1 | 9/2008 | Lortz et al. |
| 7,440,962 B1 | 10/2008 | Wong et al. |
| 7,444,401 B1 | 10/2008 | Keyghobad et al. |
| 7,467,141 B1 | 12/2008 | Steele et al. |
| 7,478,418 B2 | 1/2009 | Supramaniam et al. |
| 7,483,979 B1 | 1/2009 | Prager |
| 7,487,535 B1 | 2/2009 | Isaacson et al. |
| 7,519,813 B1 | 4/2009 | Cox et al. |
| 7,584,502 B2 | 9/2009 | Alkove et al. |
| 7,591,005 B1 | 9/2009 | Moore |
| 7,617,501 B2 | 11/2009 | Peterson et al. |
| 7,650,497 B2 | 1/2010 | Thornton et al. |
| 7,653,794 B2 | 1/2010 | Michael et al. |
| 7,661,027 B2 | 2/2010 | Langen et al. |
| 7,673,323 B1 | 3/2010 | Moriconi |
| 7,690,025 B2 | 3/2010 | Grewal et al. |
| 7,765,187 B2 | 7/2010 | Bergant et al. |
| 7,805,721 B2 | 9/2010 | Feinleib et al. |
| 7,895,332 B2 | 2/2011 | Vanyukhin et al. |
| 7,904,949 B2 | 3/2011 | Bowers et al. |
| 7,987,455 B1 | 7/2011 | Senner et al. |
| 8,024,360 B2 | 9/2011 | Moore |
| 8,086,710 B2 | 12/2011 | Vanyukhin et al. |
| 8,087,075 B2 | 12/2011 | Peterson et al. |
| 8,141,138 B2 | 3/2012 | Bhatia et al. |
| 8,245,242 B2 | 8/2012 | Peterson et al. |
| 8,346,908 B1 | 1/2013 | Vanyukhin et al. |
| 8,429,712 B2 | 4/2013 | Robinson et al. |
| 8,533,744 B2 | 9/2013 | Peterson et al. |
| 8,584,218 B2 | 11/2013 | Peterson et al. |
| 2001/0034733 A1 | 10/2001 | Prompt et al. |
| 2002/0055949 A1 | 5/2002 | Shiomi et al. |
| 2002/0078005 A1 | 6/2002 | Shi et al. |
| 2002/0112178 A1 | 8/2002 | Scherr |
| 2002/0129274 A1 | 9/2002 | Baskey et al. |
| 2002/0133723 A1 | 9/2002 | Tait |
| 2002/0138572 A1 | 9/2002 | Delany et al. |

(56) References Cited

U.S. PATENT DOCUMENTS

| | | |
|---|---|---|
| 2002/0169986 A1 | 11/2002 | Lortz |
| 2002/0169988 A1 | 11/2002 | Vandergeest et al. |
| 2002/0174366 A1 | 11/2002 | Peterka et al. |
| 2002/0178377 A1 | 11/2002 | Hemsath et al. |
| 2002/0184536 A1 | 12/2002 | Flavin |
| 2003/0009487 A1 | 1/2003 | Prabakaran et al. |
| 2003/0018913 A1 | 1/2003 | Brezak et al. |
| 2003/0023587 A1 | 1/2003 | Dennis et al. |
| 2003/0028611 A1 | 2/2003 | Kenny et al. |
| 2003/0033535 A1 | 2/2003 | Fisher et al. |
| 2003/0065940 A1 | 4/2003 | Brezak et al. |
| 2003/0065942 A1 | 4/2003 | Lineman et al. |
| 2003/0110397 A1 | 6/2003 | Supramaniam et al. |
| 2003/0115186 A1 | 6/2003 | Wilkinson et al. |
| 2003/0115313 A1 | 6/2003 | Kanada et al. |
| 2003/0115439 A1 | 6/2003 | Mahalingam et al. |
| 2003/0149781 A1 | 8/2003 | Yared et al. |
| 2003/0177388 A1 | 9/2003 | Botz et al. |
| 2003/0188036 A1 | 10/2003 | Chen et al. |
| 2003/0226036 A1 | 12/2003 | Bivens et al. |
| 2003/0229783 A1 | 12/2003 | Hardt |
| 2004/0010519 A1 | 1/2004 | Sinn et al. |
| 2004/0059953 A1 | 3/2004 | Purnell |
| 2004/0078569 A1 | 4/2004 | Hotti |
| 2004/0088543 A1 | 5/2004 | Garg et al. |
| 2004/0098595 A1 | 5/2004 | Aupperle et al. |
| 2004/0098615 A1 | 5/2004 | Mowers et al. |
| 2004/0111515 A1 | 6/2004 | Manion et al. |
| 2004/0111643 A1 | 6/2004 | Farmer |
| 2004/0117382 A1 | 6/2004 | Houseknecht et al. |
| 2004/0123146 A1 | 6/2004 | Himmel et al. |
| 2004/0128506 A1 | 7/2004 | Blakley et al. |
| 2004/0128541 A1 | 7/2004 | Blakley et al. |
| 2004/0128542 A1 | 7/2004 | Blakley et al. |
| 2004/0139050 A1 | 7/2004 | Barrett et al. |
| 2004/0139081 A1 | 7/2004 | Barrett et al. |
| 2004/0199795 A1 | 10/2004 | Grewal et al. |
| 2004/0226027 A1 | 11/2004 | Winter |
| 2004/0260565 A1 | 12/2004 | Zimniewicz et al. |
| 2004/0260651 A1 | 12/2004 | Chan et al. |
| 2005/0010547 A1 | 1/2005 | Carinci et al. |
| 2005/0044409 A1 | 2/2005 | Betz et al. |
| 2005/0055357 A1 | 3/2005 | Campbell |
| 2005/0060397 A1 | 3/2005 | Barthram et al. |
| 2005/0086457 A1 | 4/2005 | Hohman |
| 2005/0091068 A1 | 4/2005 | Ramamoorthy et al. |
| 2005/0091213 A1 | 4/2005 | Schutz et al. |
| 2005/0091250 A1 | 4/2005 | Dunn et al. |
| 2005/0091284 A1 | 4/2005 | Weissman et al. |
| 2005/0091290 A1 | 4/2005 | Cameron et al. |
| 2005/0108579 A1 | 5/2005 | Isaacson et al. |
| 2005/0114701 A1 | 5/2005 | Atkins et al. |
| 2005/0125798 A1 | 6/2005 | Peterson |
| 2005/0144463 A1 | 6/2005 | Rossebo et al. |
| 2005/0160423 A1 | 7/2005 | Bantz et al. |
| 2005/0193181 A1 | 9/2005 | Kaneda et al. |
| 2005/0198303 A1 | 9/2005 | Knauerhase et al. |
| 2005/0204143 A1 | 9/2005 | Ellington |
| 2005/0223216 A1 | 10/2005 | Chan et al. |
| 2005/0246554 A1 | 11/2005 | Batson |
| 2005/0267938 A1 | 12/2005 | Czeczulin |
| 2005/0268309 A1 | 12/2005 | Krishnaswamy et al. |
| 2005/0283443 A1 | 12/2005 | Hardt |
| 2005/0283614 A1 | 12/2005 | Hardt |
| 2006/0004794 A1 | 1/2006 | Pizzo et al. |
| 2006/0005229 A1 | 1/2006 | Palekar et al. |
| 2006/0010445 A1 | 1/2006 | Peterson et al. |
| 2006/0015353 A1 | 1/2006 | Reese |
| 2006/0021017 A1 | 1/2006 | Hinton et al. |
| 2006/0026195 A1 | 2/2006 | Gu et al. |
| 2006/0034494 A1 | 2/2006 | Holloran |
| 2006/0085483 A1 | 4/2006 | Mooney et al. |
| 2006/0116949 A1 | 6/2006 | Wehunt et al. |
| 2006/0130065 A1 | 6/2006 | Chin et al. |
| 2006/0161435 A1 | 7/2006 | Atef et al. |
| 2006/0174350 A1 | 8/2006 | Roever et al. |
| 2006/0184401 A1 | 8/2006 | DelGaudio et al. |
| 2006/0200424 A1 | 9/2006 | Cameron et al. |
| 2006/0200504 A1 | 9/2006 | Lo |
| 2006/0224611 A1 | 10/2006 | Dunn et al. |
| 2006/0248099 A1 | 11/2006 | Barrett et al. |
| 2006/0265740 A1 | 11/2006 | Clark et al. |
| 2006/0282360 A1 | 12/2006 | Kahn et al. |
| 2006/0282461 A1 | 12/2006 | Marinescu |
| 2006/0294151 A1 | 12/2006 | Wong et al. |
| 2007/0011136 A1 | 1/2007 | Haskin et al. |
| 2007/0038596 A1 | 2/2007 | Pizzo et al. |
| 2007/0083917 A1 | 4/2007 | Peterson et al. |
| 2007/0100980 A1 | 5/2007 | Kataoka et al. |
| 2007/0101415 A1 | 5/2007 | Masui |
| 2007/0143430 A1 | 6/2007 | Johnson et al. |
| 2007/0143836 A1 | 6/2007 | Bowers et al. |
| 2007/0150448 A1 | 6/2007 | Patnode |
| 2007/0156766 A1 | 7/2007 | Hoang et al. |
| 2007/0156767 A1 | 7/2007 | Hoang et al. |
| 2007/0180448 A1 | 8/2007 | Low et al. |
| 2007/0180493 A1 | 8/2007 | Croft et al. |
| 2007/0192843 A1 | 8/2007 | Peterson |
| 2007/0255814 A1 | 11/2007 | Green et al. |
| 2007/0288992 A1 | 12/2007 | Robinson |
| 2008/0104220 A1 | 5/2008 | Vanyukhin |
| 2008/0104250 A1 | 5/2008 | Vanyukhin |
| 2008/0133533 A1 | 6/2008 | Ganugapati et al. |
| 2008/0162604 A1 | 7/2008 | Soulet et al. |
| 2008/0215867 A1 | 9/2008 | Mackin et al. |
| 2009/0006537 A1 | 1/2009 | Palekar et al. |
| 2009/0216975 A1 | 8/2009 | Halperin et al. |
| 2010/0050232 A1 | 2/2010 | Peterson |
| 2011/0093570 A1 | 4/2011 | Mackin et al. |
| 2011/0282977 A1 | 11/2011 | Peterson |
| 2011/0283273 A1 | 11/2011 | Peterson |
| 2012/0192256 A1 | 7/2012 | Peterson et al. |
| 2012/0215899 A1 | 8/2012 | Peterson |
| 2012/0297035 A1 | 11/2012 | Peterson |

FOREIGN PATENT DOCUMENTS

| | | |
|---|---|---|
| WO | WO 2006/016900 | 2/2006 |
| WO | WO 2007/044613 A2 | 4/2007 |

OTHER PUBLICATIONS

"Description of Digital Certificates", Jan. 23, 2007, http://www.support.microsoft.com/kb/195724.

"Directory Administrator", http://diradmin.open-it.org/indexlphp, p. 1-3. Dec. 15, 2004.

"Innovation Report—Windows Group Policy Protocols". Jul. 31, 2006.

"Kerberos Module for Apache", http://modauthkerb.sourceforge.net/.

"LDAP Linux HOWTO", http://tldp/org/HOWTO/LDAP-HOWTO/, p. 1-2. Mar. 5, 2004.

"Lnux Authentication Against Active Directory", http://laaad/sourceforge.netlen/home/htm, p. 1-2. Dec. 15, 2004.

"NegotiateAuth", http://negotiateauth,mozdev.org/ Jul. 8, 2010.

"Optimization Techniques for Trusted Semantic Interoperation", Final Technical Report, Air Force Research Laboratory. Published May 1998.

"Project: AD4Unix: Summary", http://sourceforge.netlprojects/adunixl, p. 1-3. Dec. 15, 2004.

"Replacing NIS with Kerberos and LDAP", http://ofb.netHhess/krbldap/, p. 1-2. Dec. 15, 2004.

"Sadma", http://sadmas.sourceforge.netlen/indexlhtml. p. 1-2. Dec. 15, 2004.

"Sun Enterprise Authentication Mechanism Data Sheet", http://wwws.sun.com/jsp_utils/Printpage.jsp?url, pp. 1-4. Dec. 15, 2004.

Vintela Extends the Reach of Microsoft Group Policy to Unix and Linux; Vintela Group Policy (VGP) Provides a Framework for Unix and Linux Policy-Based Management Through the Popular Windows Group Policy System., PR Newswire, Sep. 13, 2004.

(56) References Cited

OTHER PUBLICATIONS

Nov. 18, 2011—U.S. Appl. No. 95/001,458—Office Action—Transmittal of Communications to Third Party Requester Inter Partes Reexamination, 52 pages.
Nov. 18, 2011—U.S. Appl. No. 95/001,458—Patent Owner Comments Regarding Oct. 20, 2011 Action Closing Presecution, 14 pages.
A. Leonard, "Embrace, extend, censor", Originally published May 11, 2000 on salon.com, http://archive.salon.com/tech/log/2000/05/11/slashdot_censor/.
Accelerated Examination Support Document in U.S. Appl. No. 13/198,592, filed Aug. 4, 2011.
Accelerated Examination Support Document in U.S. Appl. No. 13/198,629, filed Aug. 4, 2011.
Aelita Software Domain Migration Wizard 6.0 User's Guide, Aug. 21, 2003.
AIX 5L Differences Guide Version 5.2 Edition Published Dec. 24, 2002, Excerpt http://proquest.safaribooksonline.com/0738427047/ch09lev1sec13.
Akhgar et al., Secure ICT Services for Mobile and Wireless Communications: A Federated Global Identity Management Framework, 2006 IEEE.
Alan H. Harbitter et al., "Performance of Public-Key-Enabled Kerberos Authentication in Large Networks", Proceedings of the IEEE symposium on Security and Privacy. 2001.
Antti Tikkanen, "Active Directory and nss_idap for Linux: Centralized er Management," printed from http://www.hut.fi/cc/docskerberos/nss_Idap/htm, pp. 1-11, 2004.
U.S. Appl. No. 11/928,887 Petition to Reconsider Denial of Request for Inter Partes Reexamination filed Oct. 2, 2012.
Apurva Kumar, "The OpenLDAP Proxy Cache," IBM, India Research Lab, at least as early as May 2003.
Authentication, from Pieces of the Puzzle, Chapter 2, p. 12. (Exhibit IV to U.S. Appl. No. 95/001,872, Inter Partes Reexamination Renewed Petition (Third Party Requester to Response to Mar. 1, 2012 Office Action), dated Aug. 9, 2012.
Buell, D.A. et al., "Identity management", Internet Computing, IEEEvol. 7, Issue 6, Nov.-Dec. 2003 pp. 26-28.
Centrify Corporation's Answer and Affirmative Defenses, *Quest Software, Inc. v. Centrify Corporation and Likewise Software, Inc.*, Case No. 2:10-CV-00859-TS, United States District Court for the District of Utah, Central Division.
Centrify DirectControl Administrator's Guide Version 2.0, Aug. 15, 2005.
Chapter 9 Authentication Protocols, Distributed System & Network Security Lab, Department of Computer Science & Information Engineering, National Chiao Tung University, pp. 21-22. 1991.
Complaint, *Quest Software, Inc. v. Centrify Corporation and Likewise Software, Inc.*, Case No. 2:10-cv-00859-TS, United States District Court for the District of Utah, Central Division.
COSuser—Identity management and user provisioning for Unix, Linux and Microsoft Windows® http://www.cosuser.com/ May 24, 2010.
Damiani, E., et al, "Managing multiple and dependable identities" Internet Computing, IEEEvol. 7, Issue 6, Nov.-Dec. 2003 pp. 29-37.
David "Del" Elson, "Active Directory and Linux," printed from http://www.securityfoc.com/printable/infoc /1563, pp. 1-11, 2002.
David F. Carr, "What's Federated Identity Management?", eWeek, Nov. 10, 2003, http://www.eweek.com/printarticle/O,1761.a-111811,00.asp.
Declaration of Matthew Peterson in Support of Quest's Opposition to Centrify's Motion to Transfer Venue to the Northern District of California, *Quest Software, Inc. v. Centrify Corporation and Likewise Software, Inc.*, Case No. 2:10-cv-00859-TS, United States District Court for the District of Utah, Central Division.
Dennis, Disconnect Login (Was: FC3 Bug Week—Help Wanted) (Sep. 24, 2004).
Description of Digital Certificates, Jan. 23, 2007, available at http://www.support.microsoft.com/kb/195724.
Designing Network Security Published May 7, 1999. Excerpt http://proquest.safaribooksonline.com/1578700434/ch02lev1sec1.
Documentation for Kerberos V5 release krb5-1.3, Copyright 1985-2002, Installation Guide: http://web.mit.edu/Kerberos/krb5-1.6/krb5-1.6/doc/krb5-install.html.
Documentation for Kerberos V5 release krb5-1.3, Copyright 1985-2002, Installation Guide: http://web.mit.edu/KerberosIkrb5-1.3/krb5-1.3/doc/krb5-install.html—System Administrator's Guide: http://web.mit.edu/Kerberos/krb5-1.3/krb5-1.3/doc/krb5-admin.html—UNIX User's Guide: http://web.mit.edu/Kerberos/krb5-1.3/krb5-1.3/doc/krb5- er.html.
Documentation for Kerberos V5 release krb5-1.3, Copyright 1985-2002, System Administrator's Guide: http://web.mit.edu/Kerberos/krb5-1.6/krb5-1.6/doc/krb5-admin.html.
Documentation for Kerberos V5 release krb5-1.3, Copyright 1985-2002, UNIX User's Guide: http://web.mit.edu/kerberos/www/krb5-1.2/krb5-1.2.6/doc/user-guide.html.
European Office Action, Application No. 05728119.8-1243 dated Apr. 9, 2009.
European Patent Office Communication pursuant to Article 94(3) EPC dated Apr. 9, 2009.
Fabini et al., "IMS in a Bottle: Initial Experiences from an OpenSER-based Prototype Implementation of the 3GPP IP Multimedia Subsystem" Mobile Business, 2006. ICMB '06. International Conference on Publication Date: 2006; On pp. 13-13.
Garman, "Kerberos—The Definitive Guide," Aug. 2003, O'Reilly & Associates, Inc.
Get to One Options for moving from multiple, Unix identities to a single, AD-based authentication infrastructure with Vintela Authentication Serviceshttp://www.quest.com/Vintela_Authentication_Services/migration_options_VAS.aspx May 24, 2010.
Hank Simon, "SAML:The Secret to Centralized Identity Management", Dec. 2004, http://intelligententerprise.com/showArticle.jhtml?articleID=54200324.
IBM SecureWay Policy Director, 1999. (4 pages).
IBM z/Os V1R1.0-V1R12.0 DCE Application Development Reference: dce_ace_is_cient_authorized API call: URL: http://publib.boulder.ibm.com/infocenter/zos/v1r12/topic/com.ibm.zos.r12.euvmd00/euva6a00646.htm, Copyright IBM Corporation 1990,2010, (2 pages).
Identity Management for UNIX http://technet2.microsoft.com/WindowsServer/en/library/ab66b7d2-9cfb-4d76-b707-30a5e0dd84f31033.mspx?mfr=true Aug. 22, 2005.
Implementing Registry-Based Group Policy for Applications, Microsoft Windows 2000 Server. White Paper. 2000.
International Preliminary Report on Patentability and Written Opinion for International Application No. PCT/US2006/039302, mailed on Apr. 2, 2009, in 7 pages.
International Search Report and Written Opinion from International Patent Appl. No. PCT/US2009/038394, mailed Oct. 6, 2009, in 13 pages.
International Search Report in International Application No. PCT/US2006/039302, mailed on Jul. 3, 2008.
International Search Report PCT/US2005/008342 , mailed on Nov. 9, 2006.
Introduction to Group Policy in Windows Server 2003, Microsoft Corporation, Published Apr. 2003.
J. Barr, "The Gates of Hades: Microsoft attempts to co-opt Kerberos", Published Apr. 2000 as verified by the Internet Archive, http://web.archive.org/web/20000619011652/http://www.linuxworld.com/linuxworld/lw-2000-04/lw-04-vcontrol_3.html.
J. Brezak, "HTTP Authentication: SPNEGO Access Authentication as Implemented in Microsoft Windows 2000," http://Meta.cesnet.cz/cms/opencms/en/docs/software/devel/draft-brezek-spnego-http-04.xt, pp. 1-6. 2002.
J. Kohl et al. "RFC 1510: The Kerberos Network Authentication Service (V5)", Published Sep. 1993, http://ietfreport.isoc.org/rfc/PDF/rfc1510.pdf.
Jan De Clercq, "Win.NET Server Kerberos", http://www.winnetmag.com/WindowsSecurity/ ArticleslArticleID/26450/pg/3/3.html. Sep. 17, 2002.

(56) References Cited

OTHER PUBLICATIONS

John Brezak, "Interoperability with Microsoft Windows 2000 Active Directory and Kerberos Services," printed from http://msdn.microsft.com/library/en- /dnactdir/html/kerberossamp.asp?frame=true, pp. 1-4, 2000.

Kerberos, PACs, and Microsoft's Dirty Tricks Originally posted to slashdot.org on May 2, 2000, http://slashdot.org/comments.pl?sid=5268&threshold=1&commentsort=O&mode=thread&cid=1096250.

Langella, S. et al., "Dorian: Grid Service Infrastructure for Identity Management and Federation", Computer-Based Medical Systems, 2006. CBMS 2006. 19th IEEE International Symposium on Jun. 22-23, 2006 pp. 756-761.

Li, M., et al., "Identity management in vertical handovers for UMTS-WLAN networks", Mobile Business, 2005. ICMB 2005. International Conference on Jul. 11-13, 2005 pp. 479-484.

Likewise Software, Inc.'s Answer, Affirmative Defenses and Counterclaims, *Quest Software, Inc. v. Centrify Corporation and Likewise Software, Inc.*, Case No. 2:10-CV-00859-TS, United States District Court for the District of Utah, Central Division.

LinuX® and Windows® Interoperability Guide, Published Dec. 14, 2001, Excerpt http://proquest.safaribooksonline.com/0130324779/ch18/lev1sec3.

Lowe-Norris, Alistair G., Windows 2000 Active Directory, Chapters 8 and 9, pp. 177-245, Jan. 2000.

Matsunaga et al, "Secure Authentication System for Public WLAN Roaming, Proceedings of the 1st ACM international workshop on Wireless mobile applications and services on WLAN hotspots," San Diego, CA, A, Year of Publication: 2003, p. 113-121.

Matthew Hur, "Session Code: ARC241 architecture & infrastructure", Microsoft Corporation. Oct. 26, 2003.

MCSE in a Nutshell: The Windows 2000 Exams Published Feb. 2001. Excerpt http://proquest.safaribooksonline.com/0596000308/mcseian-CHP-13-SECT-1.

Memorandum Decision and Order Denying Defendant Centrify Corporation's Motion to Transfer Venue and Motion to Stay Pending Inter Partes Reexamination, *Quest Software, Inc. v. Centrify Corporation and Likewise Software, Inc.*, Case No. 2:10-cv-00859-TS, United States District Court for the District of Utah, Central Division.

Memorandum in Support of Centrify's Motion to Stay Pending Inter Partes Reexamination, *Quest Software, Inc. v. Centrify Corporation and Likewise Software, Inc.*, Case No. 2:10-cv-00859-TS, United States District Court for the District of Utah, Central Division.

Microsoft Corp., Implementing Registry-Based Group Policy for Applications, 2000.

Microsoft Corp., Introduction to Group Policy in Windows Server 2003, 2003.

Microsoft: CATIA Migration from UNIX to Windows, Overview, Jul. 18, 2003. (3 pages).

Microsoft: CATIA Migration from UNIX to Windows, Overview, Jul. 18, 2003, Microsoft, Chapter 8, Windows-Unix Interoperability and Data Sharing. (21 pages).

Mikkonen, H. et al., "Federated Identity Management for Grids" Networking and Services, 2006. ICNS '06. International conference on Jul. 16-18, 2006 pp. 69-69.

Mont, M.C. et al., "Towards accountable management of identity and privacy: sticky policies and enforceable tracing services", Database and Expert Systems Applications, 2003. Proceedings. 14th International Workshop on Sep. 1-5, 2003 pp. 377-382.

NCSA Introduction to Kerberos 5, All right reserved Board of Trustees of the University of Illinois Page last updated May 21, 2002 http://www.ncsa.uiuc.edu/UserInfo/Resources/Sofiware/kerberosold/introduction.html.

Neuman et al., "RFC 4120—The Kerberos Network Authentication Service V5," Network Working Group, Jul. 2005.

Neuman, et al.: "Kerberos: An Authentication Service for Computer Networks", IEEE Communications Magazine, vol. 32, Issue 9, Pub. Date Sep. 1994, relevant pp. 33-38.

O'Reily publications "Unix & Internet Security", Apr. 1996. (3 pages).

PADL Software Pty Ltd., http://www.padl.com/productsIXAD.html, pp. 1-3. Dec. 15, 2004.

PADL Software Pty Ltd., Pam_ccreds readme, (Apr. 11, 2004) (pan_crreds).

Phiri, J. et al., "Modelling and Information Fusion in Digital Identity Management Systems" Networking, International Conference on Systems and International Conference on Mobile Communications and Learning Technologies, 2006. ICN/ICONS/MCL 2006. International Conference on Apr. 23-29, 2006 pp. 181-181.

Quest Software, Inc.'s Opposition to Motion to Stay, *Quest Software, Inc. v. Centrify Corporation and Likewise Software, Inc.*, Case No. 2:10-cv-00859-TS, United States District Court for the District of Utah, Central Division.

Quest Software; "UNIX Identity Migration Wizard User Guide", 2006.

Quest Vintela Authentication Services Administrator's Guide Version 3.1, Sep. 2006.

Radeke, E., et al. "Framework for object migration in federated database systems", Cooperation Univ. of Paderborn, Germany, Parallel and Distributed Information Systems, 1994., Proceedings of the Third International Conference on Publication Date: Sep. 28-30, 1994, On pp. 187-194.

Record of Oral Hearing in Reexamination Control No. 95/001,458 of United States Patent No. 7,617,501, Argued Aug. 15, 2013.

Reply Memorandum in Support of Centrify's Motion to Stay Pending Inter Partes Reexamination, *Quest Software, Inc. v. Centrify Corporation and Likewise Software, Inc.*, Case No. 2:10-cv-00859-TS, United States District Court for the District of Utah, Central Division.

Request for Withdrawal of the European Application No. 05728119.8 on Feb. 19, 2010.

Response to Communication pursuant to Article 94(3) EOC filed Sep. 9, 2009 in EP 05728119.8.

RFC 4120—"The Kerberos Network Authentication Service V5," Neuman et al., Network Working Group, Jul. 2005.

Sandrasegaran, Hsang, Identity Management in Vertical Handovers for UMTS-WLAN Networks, 2005 IEEE.

Schroeder, SDSC's Installation and Development of Kerberos, San Diego Supercomputer Center, San Diego, CA, Sep. 20, 1995, p. 1-11.

Search Security, "Search Security.com Definitions", Jun. 4, 2007, http://searchsecurity.techtarget.com/sDefinition/0,,sid14_gci212437,00.html.

Shim, S.S.Y et al., "Federated identity management" Computer; vol. 38, Issue 12, Dec. 2005 pp. 120-122.

Shin, D. et al., "Ensuring information assurance in federated identity management", Performance, Computing, and Communications, 2004 IEEE International Conference on 2004 pp. 821-826.

Siddiqi, J. et al., "Secure ICT Services for Mobile and Wireless Communications: A Federated Global Identity Management Framework", Information Technology: New Generations, 2006. ITNG 2006. Third International Conference on Apr. 10-12, 2006 pp. 351-357.

Sixto Ortiz, Jr., "One-Time Password Technology", vol. 29, Issue 15, Apr. 13, 2007, http://www.processor.com/editorial/article.asp?article=articles%2Fp2915%2F30p15%2F30p15.asp.

Stipulated Judgment and Entry of Permanent Injunction against Likewise Software, Inc., *Quest Software, Inc. v. Centrify Corporation and Likewise Software, Inc.*, Case No. 2:10-CV-00859-TS, United States District Court for the District of Utah, Central Division.

Subject 2.15. What do I need to do to setup cross-realm authentication?, http://www.cmf.nrl.navy.mil/CCS/people/kenh/kerberos-fag.html. Jul. 8, 2010.

The SLAPD and SLURPD Administrator's Guide, University of Michigan Release 3.3 Apr. 30, 1996, available at http://www.umich.edu/~dirsvcs/ldap/doc/guides/slapd/guide.pdf.

Transcript of Jul. 22, 2011 deposition of Michael W. Dennis in *Quest Software, Inc. v. Centrify Corporation and Likewise Software, Inc.*, Case No. 2: 10-CV-00859-TS, United States District Court for the District of Utah, Central Division.

(56) References Cited

OTHER PUBLICATIONS

Turbo Fredriksson, "LDAPv3." printed from http://www.bayour.com/LDAPv3-HOWTO.html, pp. 2-65, 2001.

Ventuneac et al., A policy-based security framework for Web-enabled applications, Proceeding ISICT '03, Proceedings of the 1st International Symposium on Information and Communication Technologies, pp. 487-492.

Vintela Group Policy Technology Preview, "Extending the Power of Group Policy and Windonws Active Directory to configuration of Unix and Linux users and systems", Version 0.1, May 2004.

Wedgetail Communications; "Security Assertion Markup Language (SAML)", 2004.

Weitzner, D.J., "In Search of Manageable Identity Systems", IEEE Internet Computing, vol. 10, Issue 6, Nov.-Dec. 2006 pp. 84-86.

Windows 2000 Kerberos Authentication White Paper, Microsoft Windows 2000 Server, pp. 1-5 and 41-42. Jul. 12, 2010.

Withers, Integrating Windows 2000 and UNIX Using Kerberos, The Journal for UNIX Systems Administrators, vol. 10, No. 12, Dec. 2001. http://seann.herdejurgen.com/resume/samag.com/html/v10/i12/a5.htm.

Dec. 6, 2013 Re-Exam Decision on Appeal.

Jan. 6, 2014 Request for Rehearing by Third Party Requester in Inter Partes Reexamination.

Feb. 5, 2014 Comments on Request for Rehearing.

Jun. 17, 2014 Board decision in appeal of inter partes reexamination No. 95/002,115 of U.S. Patent No. 8,245,242.

| | 610 | 620 | 630 | 640 | 650 | 660 |
|---|---|---|---|---|---|---|
| | User ID | Group ID | Home Directory | Encrypted Password | Login Shell | Gecos |
| 705 → | User1 | Group1 | /user/group1 | Bob@home.com | Ab | Asd |
| | User2 | Group2 | /user/group2 | Ann@home.com | Bc | Sdf |
| 705 → | User3 | Group3 | /user/group3 | Mike@home.com | Cd | Dfg |
| | User4 | Group4 | /user/group4 | Beth@home.com | Cf | Fgh |
| | User5 | Group5 | /user/group5 | Will@home.com | Gh | ghj |

Identification Data Store 600

Fig. 6

CENTRALIZED USER AUTHENTICATION SYSTEM APPARATUS AND METHOD

RELATED APPLICATIONS

The entire disclosure of each application listed in the foreign and domestic priority sections of the Application Data Sheet filed concurrently with this application is hereby incorporated by reference into this application.

BACKGROUND OF THE INVENTION

1. Field of the Invention

The present invention relates to network authentication services. Specifically, the invention relates to apparatus, systems, and methods for authenticating a user.

2. Description of the Related Art

In recent years, computer networks have become vital to many aspects of life including business, education, and government in part due to their ability to transfer sensitive information securely and efficiently. As the proliferation of computer networks continues, the desirability of enhancing network security increases. An important aspect of network security includes user authentication processes.

FIG. 1 illustrates a typical prior art computer network 100. The depicted network includes multiple computers 110 each having an authentication module 120, an identification module 130, an authentication data store 140, and an identification data store 150. To gain access to a computer 110, a user must enter a valid username and authentication name. Accordingly, the identification module 130 receives the username and identifies the user against the local identification data store 150. Similarly, the authentication module 120 receives the authentication name and authenticates the user against the local authentication data store 140.

Though this approach enables user authentication, the approach includes certain limitations. For example, enabling a user to logon to any computer 110 requires each computer 110 to have an updated authentication and identification data store 140,150. If computers are added to the network 100, each new computer must be provided with updated data stores 140,150. Furthermore, each data store 140,150 must be managed and updated as users are added or removed from the network. In short, providing each network computer 110 a locally managed authentication and identification data store 140,150 requires considerable time and effort.

One user authentication solution involves providing a merged repository of identification and authentication data available to network computers. A typical example of this includes merging all the user identification and authentication data into a NIS or LDAP repository. However, merging the identification and authentication data can involve considerable time and effort as some networks may include hundreds of users.

Given the aforementioned issues and challenges related to providing user authentication services, a need exists for an apparatus, system, and method for providing enhanced user authentication services. Beneficially, such a system, apparatus, and method would enable user authentication without requiring considerable time and effort in creating, managing, and maintaining the service.

SUMMARY OF THE INVENTION

The present invention has been developed in response to the present state of the art, and in particular, in response to the problems and needs in the art that have not yet been fully solved by currently available user authentication means and methods. Accordingly, the present invention has been developed to provide a system, apparatus, and method for authenticating a user that overcome many or all of the above-discussed shortcomings in the art.

In one aspect of the present invention, a user authentication apparatus includes an identification module that receives a password request for a specified user and communicates an encrypted password field in response thereto. The encrypted password field references a directory object corresponding to the specified user. The authentication apparatus also includes an authentication module that communicates the password request to the identification module and receives the encrypted password field therefrom. The authentication module authenticates the specified user against the directory object. In some embodiments, the apparatus includes an identification data store that stores the encrypted password field and an authentication data store that stores the directory object.

In another aspect of the present invention, a user authentication system includes an identification subsystem that receives a password request for a specified user and provides an encrypted password field in response thereto. In some embodiments, the identification subsystem includes other identification modules such as a NSS-NIS module, a NSS-LDAP module, one or more NSS-Files modules, etc. The encrypted password field references a directory object corresponding to the specified user. In one embodiment, the encrypted password field comprises a Kerberos principal name.

The system may also include an authentication subsystem that communicates the password request to the identification subsystem, receives the encrypted password field therefrom, and authenticates the specified user against the directory object. In some embodiments, the authentication subsystem includes a pluggable authentication module (PAM) or Kerberos module. In some embodiments, the system includes an identification server that stores a reference to the directory object in the encrypted password field. In some embodiments, the system includes an authentication server that stores the directory object referenced by the encrypted password field. In certain embodiments, the identification subsystem and the authentication subsystem are part of a Linux or UNIX computer system.

The present invention is entirely backward compatible with authentication systems having an authentication and identification subsystem already in place. In some scenarios, implementing the present invention may only require installing an authentication module of the present invention in an existing authentication subsystem. Additionally, providing an authentication subsystem with centralized data stores facilitates creation, management, and maintenance of the system, even under the weight of hundreds of users. Accordingly, the present invention provides for backward compatibility, simple installation, and facilitated creation, management, and maintenance.

In another aspect of the present invention, a method for authenticating a user includes the operations of prompting a user for a username, retrieving an encrypted password field corresponding to the username, and authenticating the user against a directory object referenced by the encrypted password field. In certain embodiments, retrieving an encrypted password field includes accessing an identification data store that stores the encrypted password field. In some embodiments, authenticating the user against the directory object includes accessing an authentication data store that stores directory object referenced by the encrypted password field.

In another aspect of the present invention, a method for installing centralized user authentication services includes creating a directory object corresponding to a specified user, referencing the directory object with an encrypted password field in an identification data store, providing an identification module that receives a password request corresponding to the user and communicates the encrypted password field in response thereto, and providing an authentication module that communicates the password request and authenticates the specified user against the directory object. In some embodiments the method includes providing an authentication data store capable of storing directory objects.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which:

FIG. 6 is a flow chart diagram illustrating one embodiment of a method for authenticating a user in accordance with the present invention; and FIGS. 1-6 are described in more detail in the section entitled "DETAILED DESCRIPTION OF THE INVENTION."

DETAILED DESCRIPTION OF THE INVENTION

Figure 1:
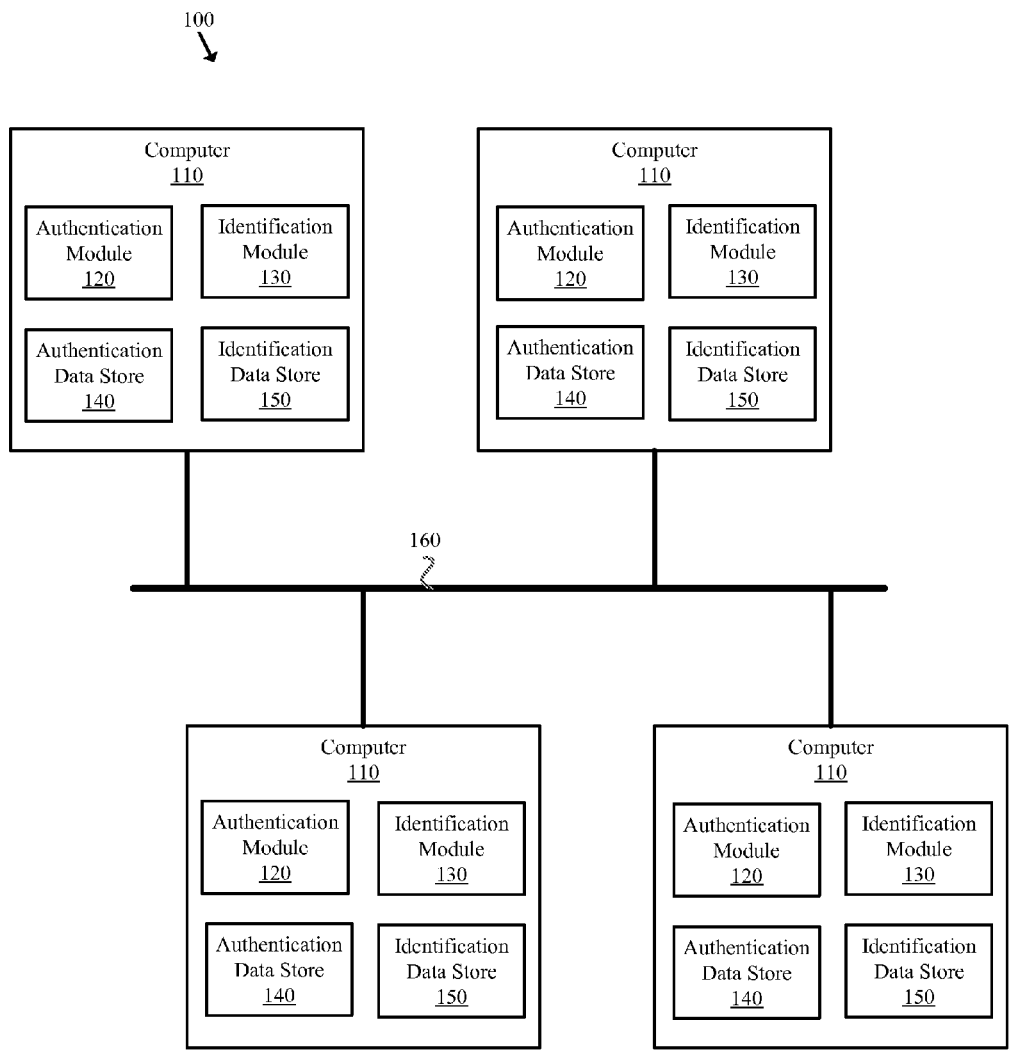
FIG. 1 is a block diagram illustrating a typical prior art authentication system.
Figure 2:
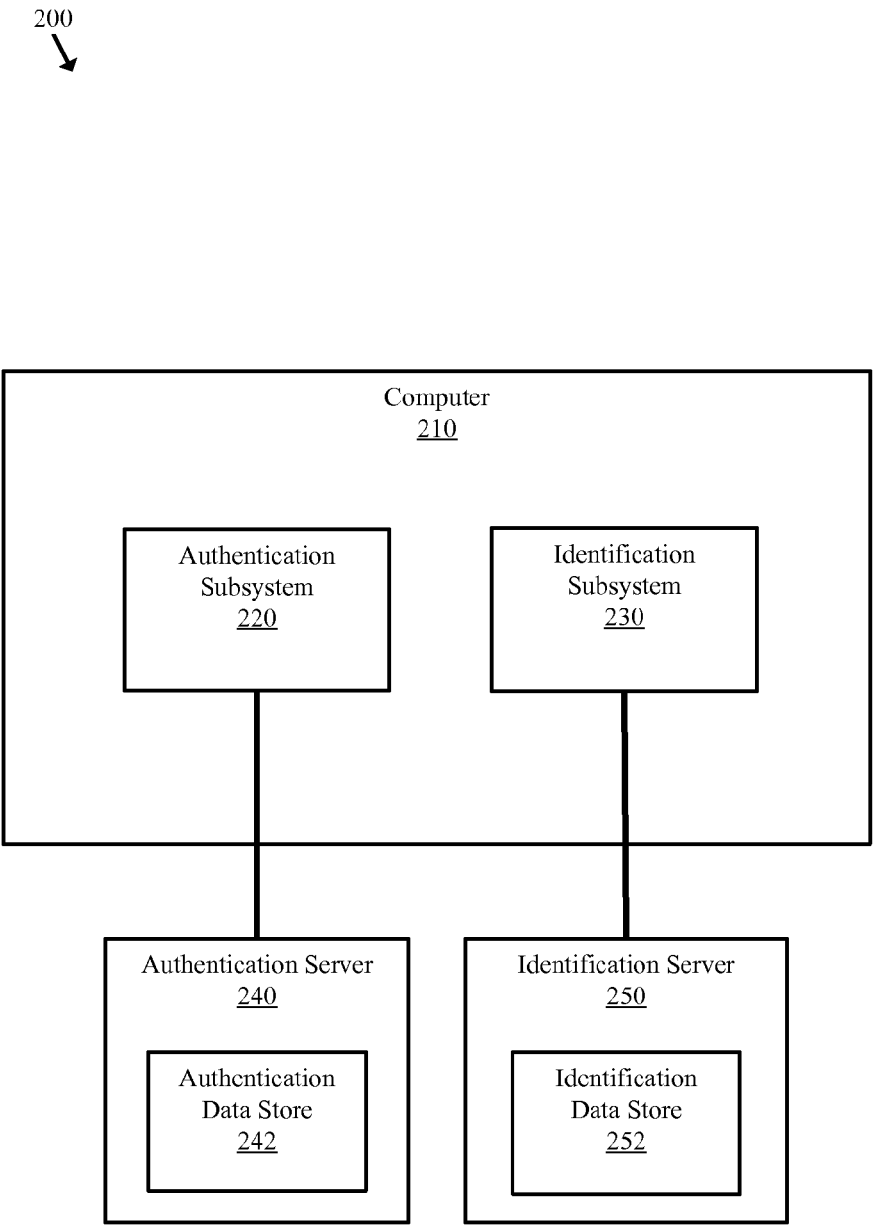
FIG. 2 is a block diagram illustrating one embodiment of a user authentication system in accordance with the present invention.

It will be readily understood that the components of the present invention, as generally described and illustrated in the Figures herein, may be arranged and designed in a wide variety of different configurations. Thus, the following more detailed description of the embodiments of the apparatus, method, and system of the present invention, as represented in FIG. 2, is not intended to limit the scope of the invention, as claimed, but is merely representative of selected embodiments of the invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

The features, structures, or characteristics of the invention described throughout this specification may be combined in any suitable manner in one or more embodiments. For example, reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," or similar language throughout this specification do not necessarily all refer to the same embodiment and the described features, structures, or characteristics may be combined in any suitable manner in one or more embodiments.

FIG. 2 is a block diagram illustrating one embodiment of an authentication system 200 in accordance with the present invention. The depicted authentication system 200 includes a computer 210, an authentication subsystem 220, an identification subsystem 230, an authentication server 240, an authentication data store 242, an identification server 250, and an identification data store 252. The system 200 significantly reduces the time and effort required in providing centralized user authentication services via subsystem cooperation 220,230 and a centralized authentication data store 242 and an identification data store 252 which may or may not be centralized.

The authentication subsystem 220 communicates a password request corresponding to a specified user to the identification subsystem 230. The identification subsystem 250 receives the password request corresponding to the specified user from the authentication subsystem 220. Upon receiving the request, the identification subsystem 250 communicates with the identification server 250 to retrieve the user's encrypted password field which references a directory object within the authentication data store 242. The identification subsystem 230 then forwards the user's encrypted password field to the authentication subsystem 220. In certain embodiments, the encrypted password filed includes non-encrypted authorization or identification information for the user.

Upon receiving the encrypted password field, the authentication subsystem 220 communicates with the authentication server 240 to authenticate the user against the referenced directory object. Accordingly, the authentication subsystem 220 relies on the identification module 230 and the centralized authentication data store 242 to complete the authentication processes. Additionally, the identification subsystem 230 participates in the authentication process by cooperating with the authentication module 220 and drawing upon the centralized identification data store 252.

The computer 210 may include any computer system having an authentication subsystem 220 and an identification subsystem 230. In certain embodiments, the computer 210 runs an operating system based on the Linux code base such as RedHat Linux, Turbo Linux, Laser5 Linux, Kondara MNU/Linux, Vine Linux, Slackware Linux, Plamo Linux, or Debian GNU/Linux. In other embodiments, the computer 210 runs a UNIX based operating system such as Hewlett-Packard Unix (HPUX), Advanced Interactive eXecutive (AIX), Berkeley Software Distribution (BSD Unix), SCO Unix, or Macintosh Operating System.

Figure 3:
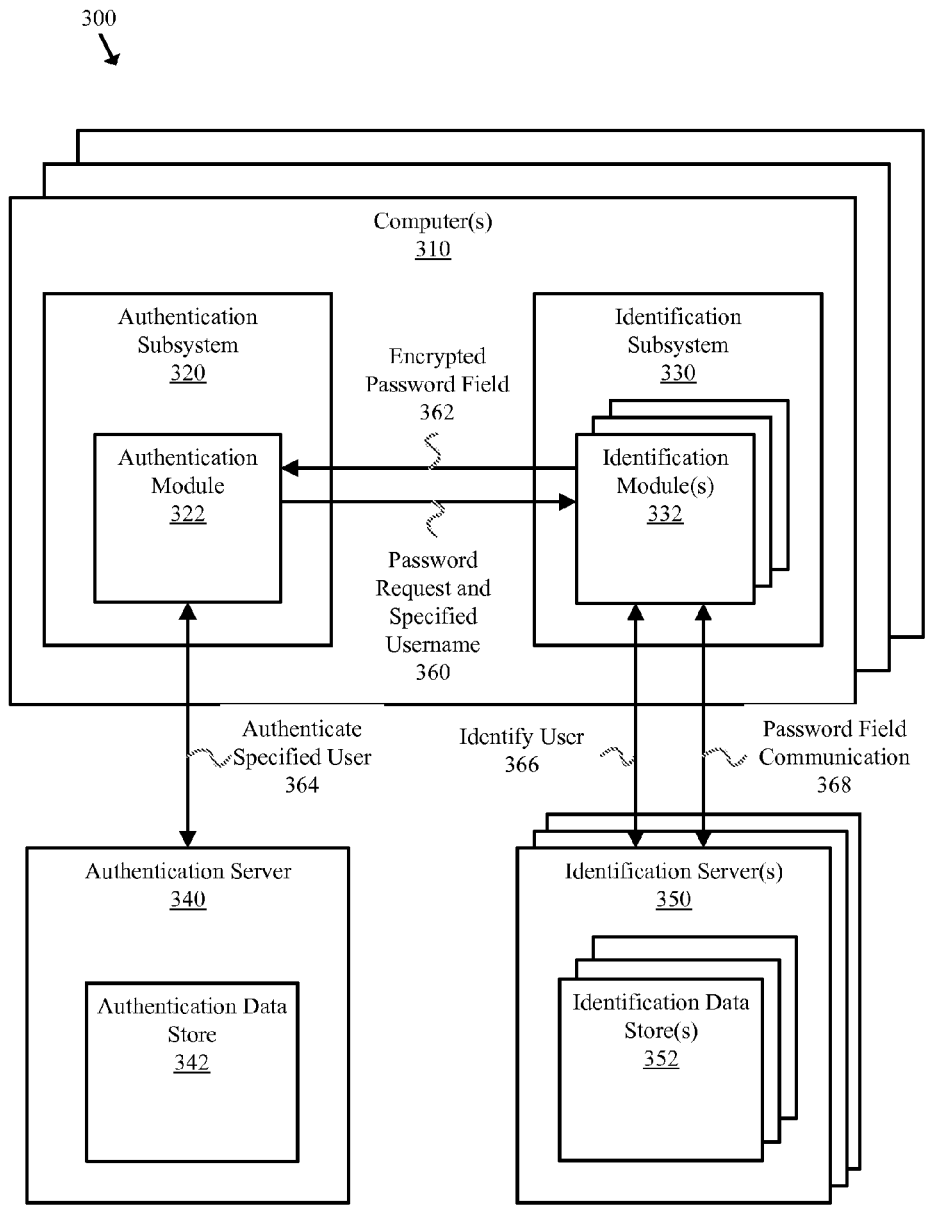
FIG. 3 is a block diagram illustrating one embodiment of a user authentication system typology in accordance with the present invention.

FIG. 3 is a block diagram illustrating one embodiment of a user authentication apparatus 300 in accordance with the present invention. The depicted authentication apparatus 300 includes one or more computers 310 with an authentication subsystem 320 and an identification subsystem 330, an authentication server 340, and one or more identification servers 350. The components of the system 300 facilitate user authentication by enabling modular cooperation and providing centralized user identification and authentication.

The depicted authentication subsystem 320 includes an authentication module 322. The authentication subsystem 320 may correspond to the authentication subsystem 220 of FIG. 2. The authentication module 322 may generate a password request 360 for a specified username, receiving an encrypted password field 362 in response thereto, and authenticating the specified user 364 against a directory object referenced by the encrypted password field. In certain embodiments, the password request 360 includes a request to the password hash field assigned to a UNIX or Linux user. In other embodiments, a password request includes a request for user information in addition to the encrypted password field of a user. In some embodiments the authentication module 322 is a pluggable authentication module (PAM) or a Kerberos module.

The depicted identification subsystem 330 may include one or more identification modules 332. The identification subsystem 230 may correspond to the identification subsystem 220 of FIG. 2. The identification module 332 may include any variety of modules capable of receiving a password request 360 for a specified user and communicating the user's encrypted password field 362 in response thereto. In certain embodiments, the identification module 332 includes a plurality of identification modules 332, each capable of interacting with the authentication module 322 and identification server 350. In one embodiment, each identification module 332 communicates with a corresponding data store 352 to obtain the specified user's encrypted password field 368.

The identification module 332 validates the identity of the specified user. For example, the identification module 332 may receive a username from the specified user and validate the user 366 by communicating with the identification server 350 and verifying that the user name is found within the identification data store 352. In certain embodiments, the identification module 432 may include, but is not limited to, a NSS-NIS module, a NSS-LDAP module, or one or more NSS-Files module.

In certain embodiments, the user records (not shown) within the identification data store 352 include an encrypted password field. The user records may also include additional data such as the data described in FIG. 6. In some embodiments, the identification server 350 includes a plurality of identification data stores 352, each corresponding to one or more identification modules 332. Providing a centralized identification data store 352 facilitates the expeditious creation, maintenance, and distribution of usernames and encrypted password fields to any network computer 310.

In certain embodiments, the authentication data store 342 includes a plurality of directory objects. A directory object may include any variety or sequence of data capable of representing a user or similar entity for authentication purposes. In certain embodiments, a directory object includes a Kerberos security principal. In certain embodiments, the directory object includes a unique authentication name or identifier. For example, the directory object may include a Kerberos principal name. Similar to an identification data store 352, a centralized authentication data store 442 facilitates the creation, maintenance and distribution of authentication data to any network computer 310.

Figure 4:
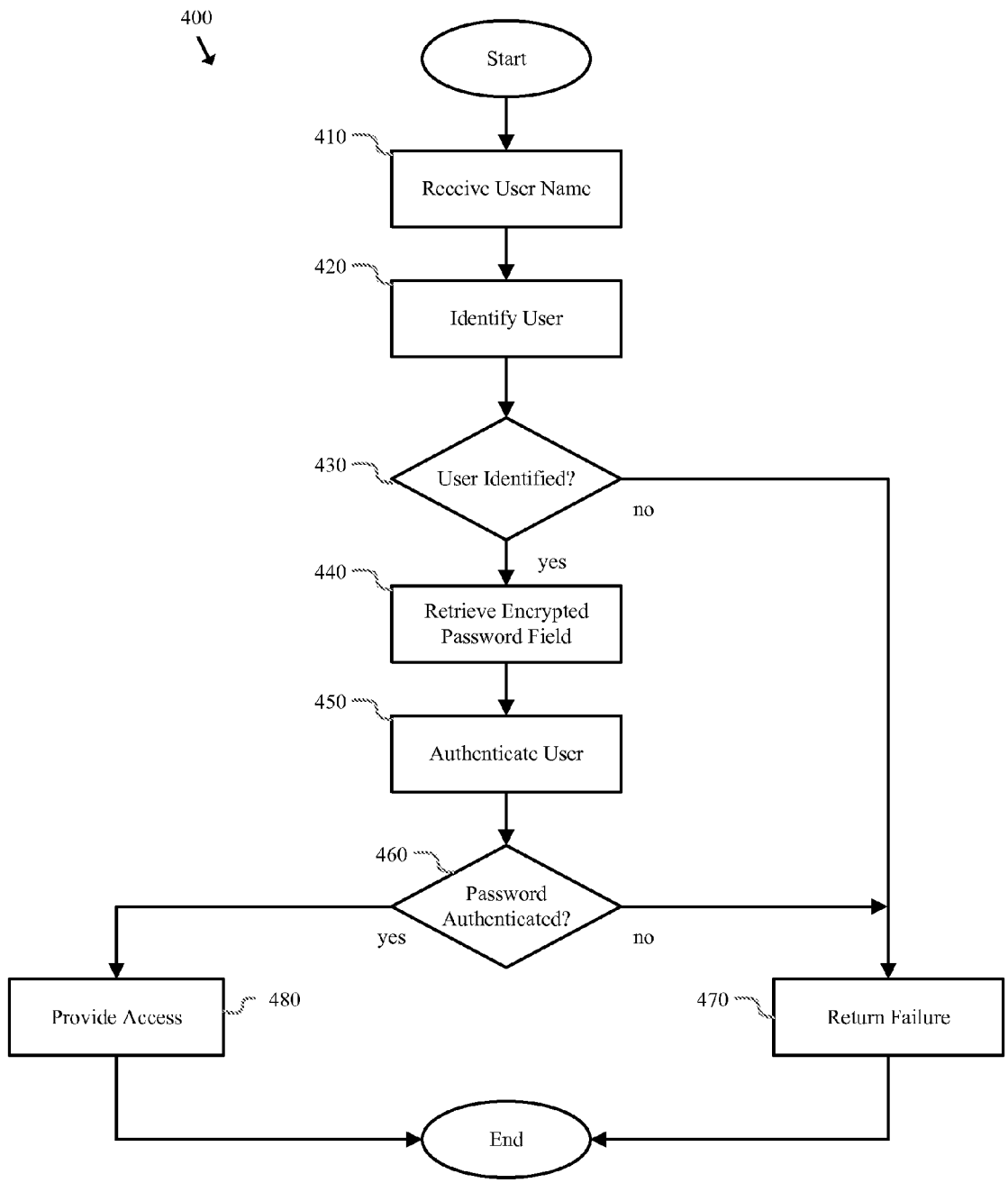
FIG. 4 is a block diagram illustrating one embodiment of a user authentication apparatus in accordance with the present invention.

FIG. 4 is a flow chart diagram illustrating a method for authenticating a user in accordance with the present invention. The depicted method 400 includes the operations of receiving 410 a username, identifying 420 the user, testing 430 if the user is identified, retrieving 440 the user's password, authenticating 450 the user's password, testing 460 if the user is authentic, and returning 470 a failure status for the user or providing 480 access to the user. The various operations of the method 400 enable user authentication via modular cooperation and centralized data stores.

Receiving 410 a username may include an identification subsystem 230 receiving a username from a user. In certain embodiments, receiving 410 a username may occur in response to prompting a user for a username. Identifying 420 the user may include the identification subsystem 230 communicating with an identification server 250 to ascertain the validity of the username. Returning 470 a failure may include returning an error message to the user and denying access to the computer. If the username is valid, the method 400 may continue by retrieving 440 the user's password.

Retrieving 440 the user's password may include an authentication subsystem 220 communicating a password request to an identification subsystem 230, the identification subsystem 230 communicating with an identification server 250 to obtain the user's encrypted password field, and forwarding the encrypted password field to the authentication subsystem 220. Authenticating 450 the user may include an authentication subsystem 220 communicating with an authentication server 240 to authenticate the user against a directory object referenced by the encrypted password field. If the user is not authenticated, the method 400 may continue by returning 470 a failure status. Otherwise, the method 400 may continue by providing 480 access to the user.

Figure 5:
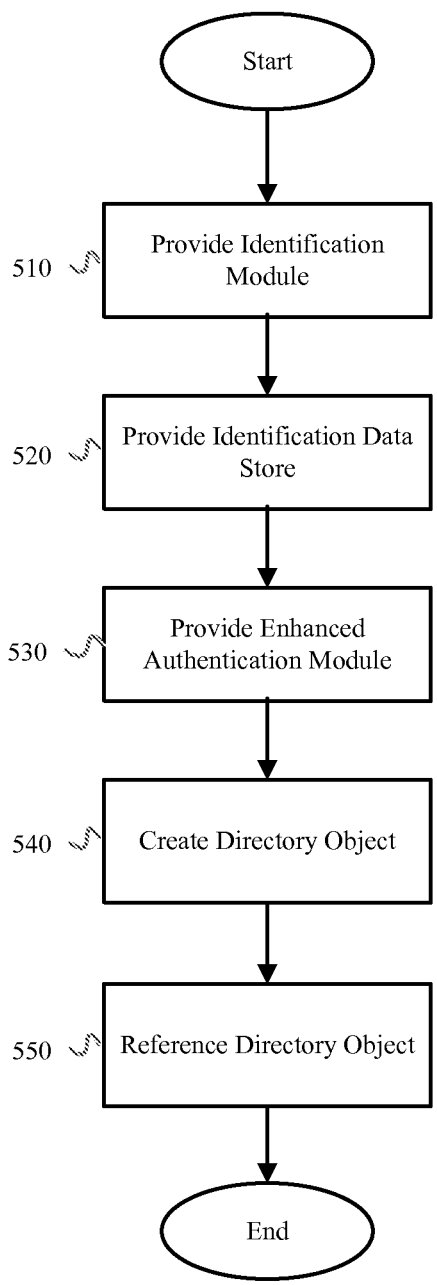
FIG. 5 is a flow chart diagram illustrating one embodiment of a method for authenticating a user in accordance with the present invention.

FIG. 5 is a flow chart diagram illustrating a method 600 for authenticating a user in accordance with the present invention. The depicted method 500 includes the operations of providing 510 an identification module, providing 520 an identification data store, providing 530 an authentication module, creating 540 a directory object, and 550 referencing the directory object. The method 500 provides a series of operations for setting up a user authentication environment consistent with the present invention.

Providing 510 an identification module may include providing one or more identification modules consistent with the identification module 532 of FIG. 5. More specifically, providing 510 an identification module may include an identification module 332 capable of receiving a password request 360 and communicating an encrypted password field 362 in response thereto.

Providing 520 an identification data store may include providing a location for storing multiple usernames and encrypted password fields such as an identification data store 352 placed on an identification server 350. Providing 520 an identification data store may also include enabling the identification module 332 and the identification data store 352 to communicate with one another over a network.

Providing 530 an authentication module may include providing an authentication module consistent with the authentication module 322 of FIG. 3. Providing 430 an authentication module may include providing an authentication module capable of issuing a password request 360 to the identification module 332, receiving an encrypted password field 362 in response thereto, and authenticating a user 364 against a directory object referenced by the encrypted password field. The authentication module 322 may be a PAM or Kerberos module capable of performing the operations described herein.

Creating 540 a directory object may include creating a directory object in a data store 342 of an authentication server 340. Referencing 550 the directory object may include referencing the directory object in an encrypted password field stored in the aforementioned identification data store 352. In certain embodiments, the encrypted password field is a password hash field of a UNIX system. In some embodiments, the encrypted password field corresponds to a Kerberos principal name.

FIG. 6 is a table illustrating one embodiment of an identification data store 600 in accordance with the present invention. The depicted data store 600 includes one or more user records entries 705. In the depicted embodiment, each record 705 includes a UserID field 610, a Group ID field 620, a Home Directory field 630, an Encrypted Password field 640, a Login Shell field 650, and a Gecos field 660. The depicted user records 705 exemplify some of the data fields that might be found on an identification data store 352 of an identification server 352 (see FIG. 3).

In certain embodiments, as the identification module 332 receives a password request for a specified user. The identification module 332 then queries the identification data store 600 for a record or entry 705 corresponding to the specified user. After locating an entry the specified user, the identification module 332 requests the encrypted password field 340 of the specified user. For example, the identification module may return the encrypted password field corresponding to User3 is Mike@home.com in response to a UNIX getpwnam( )function call invoked by the login shell (not shown. Accordingly, Mike@home.com is forwarded by the identification module 332 to the authentication module 322. The authentication module 322 then authenticates the user against the directory object referenced by the encrypted password field (i.e. Mike@home.com). Accordingly, the present invention may reference a user's directory object with an encrypted password field.

The present invention facilitates providing authentication services to legacy applications and systems. Additionally, the present invention is entirely backward compatible with authentication systems having an authentication and identification subsystem already in place. In some scenarios, implementing the present invention may only require installing an authentication module of the present invention in an existing authentication subsystem. Additionally, providing an authentication subsystem with centralized data stores facilitates creation, management, and maintenance of the system, even under the weight of hundreds of users. Accordingly, the present invention provides for backward compatibility, simple installation, and facilitated creation, management, and maintenance.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A system to authenticate a user, the system comprising:
  a computer system comprising computer hardware, the computer system programmed to implement:
    a directory-based authentication server that authenticates users based on directory objects;
    a non-directory based legacy identification subsystem that is not configured for directory-based authentication;
    an enhanced authentication module in communication with the directory-based server and the non-directory based legacy identification subsystem wherein the enhanced authentication module obtains a directory object reference from a data field of an identification data store of the legacy identification system and provides the directory object reference to the directory-based authentication system;
    wherein the non-directory based legacy identification subsystem comprises an identification data store that includes a data field having a directory object reference stored therein, the directory object reference configured to reference a directory object that is stored separately from the legacy identification system, wherein the directory object is configured to uniquely identify a specified user, and wherein the directory object reference is stored in the data field in place of authentication information native to the legacy identification system;
    wherein the authentication module is configured to generate a request for authentication information of a specified user from the identification subsystem, and in response to receiving a response to the request, to access the data field in the identification data store of the legacy system to obtain the directory object reference stored therein, and wherein the authentication module further configured to obtain the directory object reference from the data field of the identification data store of the legacy system rather than authentication information native to the legacy system and to transmit the directory object reference to the directory-based authentication server; and wherein the directory-based authentication server accesses the directory object stored separately from the non-directory based legacy system based on the directory object reference provided by the enhanced authentication module to authenticate the specified user against the directory object.

2. The system of claim 1, wherein the data field of the identification data store comprises a principal name.

3. The system of claim 1, wherein the identification subsystem is configured to identify the specified user upon receiving a username.

4. The system of claim 1, wherein the authentication subsystem comprises a pluggable authentication module.

5. The system of claim 1, wherein the identification subsystem comprises a plurality of identification modules selected from the group consisting of a NSS-NIS module, a NSS-LDAP module, and a NSS-File module.

6. A method to authenticate a user, the method comprising:
by a computer system comprising computer hardware:
modifying an identification data store that is configured to store authentication information native to a legacy identification system to store a directory object reference therein, wherein the directory object reference references a directory object that is stored separately from the legacy identification system, and wherein the directory object is configured to uniquely identify a specified user within the identification data store instead of storing authentication information native to the legacy identification system within the identification data store;

providing an identification module configured to receive a request for authentication information corresponding to the specified user;

accessing the identification data store in the legacy system to obtain the directory object reference stored therein;

communicating the directory object reference stored in the identification data store to an authentication module in response to receiving the request; and transmitting the directory object reference from the authentication module to an authentication server configured to access the directory object stored separately from the legacy system based on the directory object reference and to authenticate the specified user against the directory object referenced by the identification data store.

7. The method of claim 6, wherein providing an authentication module comprises providing a pluggable authentication module.

8. The method of claim 6, wherein the authentication information comprises a principal name.

9. The method of claim 6, wherein the providing an identification module comprises providing a plurality of identification modules selected from the group consisting of a NSS-NIS module, a NSS-LDAP module, and a NSS-Files module.

10. The method of claim 6, wherein the providing an identification module comprises providing an identification module configured to identify the specified user upon receiving the username.

* * * * *